United States Patent
Angellotti

(10) Patent No.: US 6,715,185 B2
(45) Date of Patent: Apr. 6, 2004

(54) SELF ALIGNING PANEL FASTENER

(75) Inventor: Roger A. Angellotti, Clarkston, MI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 10/202,700

(22) Filed: Jul. 25, 2002

(65) Prior Publication Data

US 2004/0016088 A1 Jan. 29, 2004

(51) Int. Cl.[7] .............................. F16B 19/00; F16B 5/00
(52) U.S. Cl. ............................................. 24/297; 24/458
(58) Field of Search ................... 24/297, 458; 411/508, 411/509, 510, 913; 248/231.9; 403/408.1

(56) References Cited

U.S. PATENT DOCUMENTS

| | | | | |
|---|---|---|---|---|
| 3,037,596 A | * | 6/1962 | Fordyce | 24/297 X |
| 4,581,793 A | * | 4/1986 | Micklitz | 24/697.1 |
| 5,897,278 A | * | 4/1999 | Frattarola | 411/549 |
| 6,457,217 B2 | * | 10/2002 | Yoshii et al. | 24/297 |

FOREIGN PATENT DOCUMENTS

| | | | |
|---|---|---|---|
| JP | 410213115 | * | 8/1998 |
| JP | 411125224 | * | 5/1999 |
| JP | 2000009117 | * | 1/2000 |
| JP | 2000055020 | * | 2/2000 |

* cited by examiner

Primary Examiner—Robert J. Sandy
(74) Attorney, Agent, or Firm—Mark W. Croll; Paul F. Donovan

(57) ABSTRACT

A panel fastener forming a blind connection between a primary and secondary panel is herein disclosed. The panel fastener is constructed and arranged to be preassembled with an attachment structure extending from an undersurface of the primary panel. The head of the panel fastener has an alignment detent or detent extending therefrom that engages the attachment structure of the primary panel so as to maintain the panel fastener in a predetermined orientation therewith. The panel fastener has a shank with a retaining mechanism constructed and arranged to be received and retained in a bore formed through a secondary panel.

19 Claims, 2 Drawing Sheets

SELF ALIGNING PANEL FASTENER

FIELD OF THE INVENTION

The present invention is drawn to a panel fastener having an alignment mechanism coupled thereto for maintaining the panel fastener in a predetermined orientation in order to facilitate the assembly of a primary panel to a secondary panel by means of the panel fastener.

BACKGROUND OF THE INVENTION

In many manufacturing processes, and in particular in the fabrication of automobiles, it is often necessary to secure a primary panel such as an exterior panel of the automobile to a secondary panel such as the framework of the automobile. Panel fasteners useful for securing a primary panel to a secondary panel may take many shapes and function in different ways. Of particular importance to the present invention are those types of panel fasteners that are preassembled with the primary panel by means of a structure commonly referred to as a dog house that extends from an undersurface of the primary panel. The heads of such prior art panel fasteners are preassembled with the primary panel by securing the head of the prior art panel fastener to the dog house, typically by means of a snap fit type of connection. Once a desired number of prior art panel fasteners have been secured to the primary panel, the primary panel may be secured to the secondary panel by inserting the shank end of the panel fastener into a bore formed through the secondary panel. The benefit to the use of the dog house to secure the panel fastener to the primary panel is that a blind connection may be made between the primary and secondary panels, i.e., there is no externally visible fastener present in the primary panel once the connection between the primary and secondary panels has been made.

A problem common to the type of prior art panel fasteners described above is that the connection between the head of the prior art panel fastener and the dog house is typically loose enough to permit a certain amount of undesirable play between the dog house and the prior art panel fastener. As a result, the shank of the panel fastener may be difficult to align with the bore formed through the secondary panel. When the shank of the prior art panel fastener becomes misaligned with the bore formed in the secondary panel due to the play in the connection between the dog house and the fastener, it is necessary to adjust the primary panel in order to align the fastener with the bore in the secondary panel. As can be appreciated, because the connection between the primary and secondary panels is blind and because the primary panel becomes successively more immobile as each of the prior art panel fasteners is secured to the secondary panel, it can be difficult to properly seat the shank of a typical prior art panel fastener in its cooperating bore in the secondary panel. At best, these adjustments can be time consuming, and at worst, the primary panel must be disassembled from the secondary panel in order to replace broken or damaged prior art panel fasteners. Accordingly, there is a recognized need for a panel fastener having an alignment mechanism that maintains the panel fastener in a predetermined orientation with regard to the primary panel when the panel fastener is preassembled with the primary panel so as to avoid the problems of misalignment during assembly of the primary panel to the secondary panel.

SUMMARY OF THE INVENTION

A panel fastener according to the present invention essentially comprises a head, a shank with a retaining mechanism, and an alignment mechanism. The head of the panel fastener has an upper plate and a lower plate that are connected by a post that maintains the plates in a generally parallel relationship. The plates are spaced away from one another by a distance defined by the length of the post. The post is itself constructed and arranged to be received and retained in a slot formed in a bottom surface of a doghouse that extends from an undersurface of the primary panel.

The shank of the panel fastener is secured to a lower plate of the head and extends away therefrom generally perpendicularly. The shank also has a retaining structure that secures the shank of the panel fastener in a bore formed in the secondary panel when the shank is inserted into the bore.

The alignment mechanism of the panel fastener of the present invention comprises a detent that is secured to an undersurface of the upper plate of the head. The detent extends from the upper plate in the direction of the lower plate and is constructed and arranged to engage the bottom surface of the doghouse when the post of the head is received in the slot formed in the doghouse. When engaged, the detent maintains the panel fastener in a predetermined alignment with respect to the doghouse. The detent of the panel fastener is self-centering with respect to a cooperating bore or depression formed in the bottom surface of the dog house. The detent itself is preferably symmetrical, having a number of faces that taper from a narrow tip to a broad base, but the detent may take many shapes, including pyramidal, conical, frustoconical, and hemispherical. The bore or depression formed in the bottom surface of the dog house cooperates with the detent to position the panel fastener and is preferably circular or rectangular in shape.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
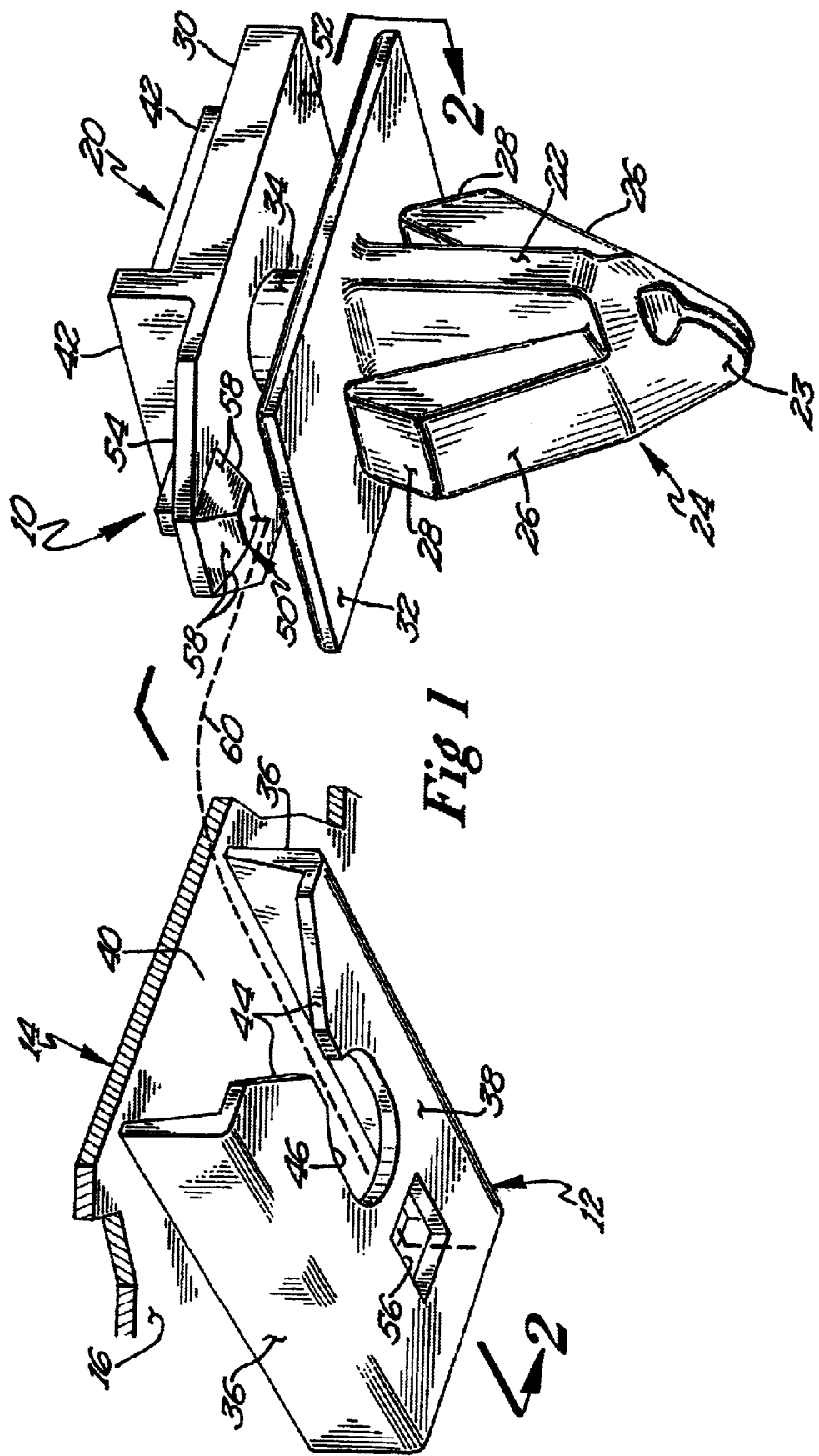
FIG. 1 is a perspective view of a panel fastener of the present invention shown prior to preassembly with a dog house extending from the back of primary panel.
Figure 2:
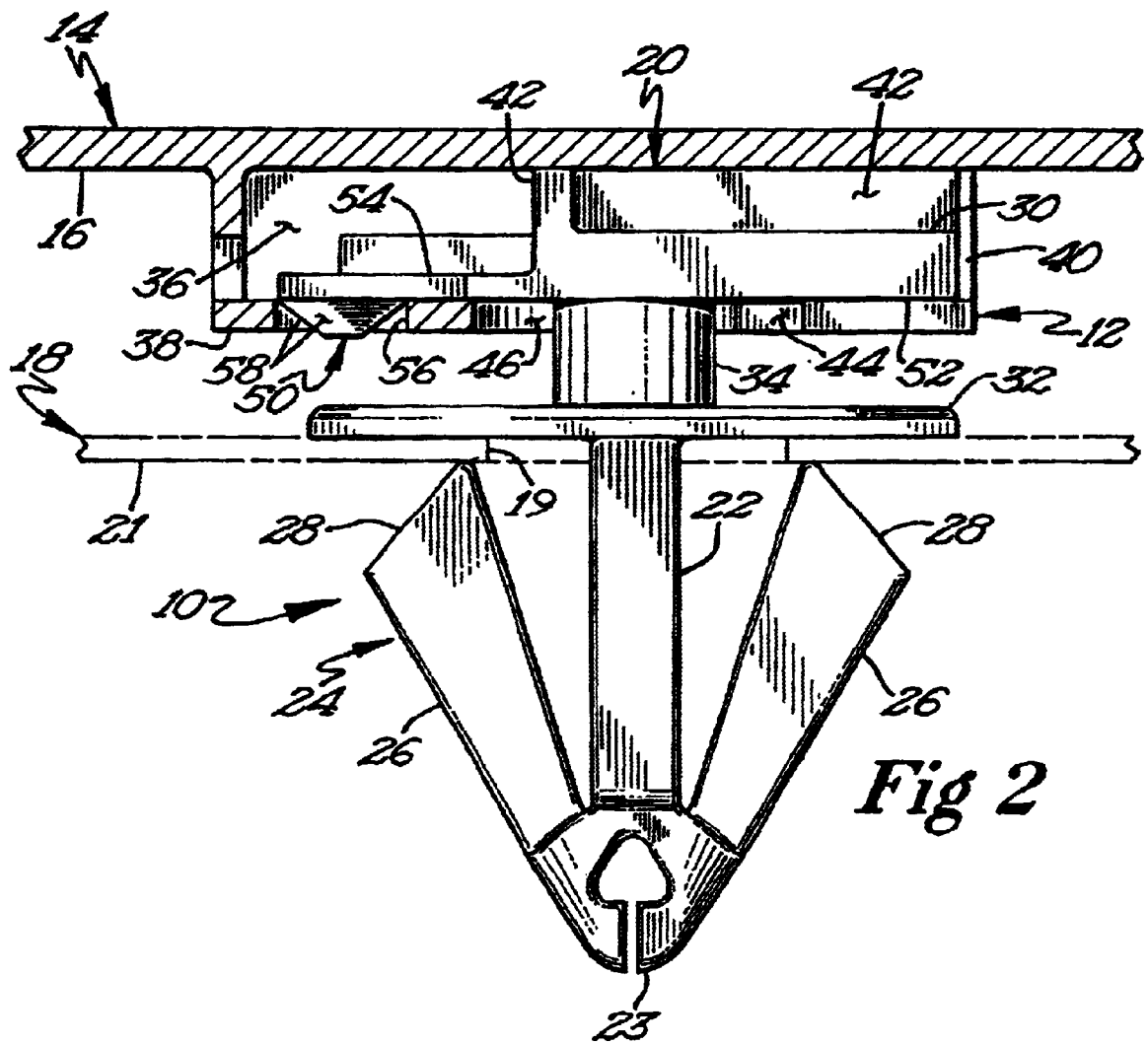
FIG. 2 is a partial cross-section side view of a panel fastener of the present invention wherein the panel fastener has secured the primary panel to the secondary panel.

FIG. 1 illustrates a panel fastener 10 of the present invention and a typical dog house 12 that extends from an undersurface 16 of a primary panel 14. FIG. 2 illustrates how the panel fastener 10 is employed to secure the primary panel 14 to a secondary panel 18.

The panel fastener 10 essentially comprises a head 20 and a shank 22, the shank 22 being secured to and extending generally perpendicularly away from the head 20. The shank 22 further comprises a retaining mechanism 24 that is constructed and arranged to retain the shank 22 of panel fastener 10 in a bore 19 formed through the secondary panel 18. The retaining mechanism can take many forms and is therefore not to be limited to those structures herein illustrated and described. A preferred embodiment of the retaining mechanism 24 comprises a pair of arms 26 that are secured to the shank 22 near its tip 23. In the present invention, the tip 23 of the shank 22 is split so as to allow the arms 26 to be deflected inwardly into contact with the shank 22 as the shank 22 is inserted into the bore 19 formed through the secondary panel 18. Once the distal ends 28 of the arms 26 pass through the bore 19, the arms 26 return to their initial positions away from the shank 22 such that the distal ends 28 of the arms 26 engage the undersurface 21 of the secondary panel 18, thereby retaining the panel fastener 10 in the secondary panel 18. As can be appreciated, the panel fastener 10 is preferably fashioned from a resilient material that has sufficient stiffness to act as a fastener and yet retains enough resiliency so as to be easily installed and not shatter during use. Generally speaking, the panel fastener 10 will be molded from a plastic material, either thermoplastic or thermoset, and will have a monolithic structure, but may be over-molded or assembled from discrete parts.

The head 20 of the panel fastener 10 generally comprises an upper plate 30 and a lower plate 32 that are secured to one another in a spaced apart and generally parallel relationship by a post 34. It is to be understood that the geometrical orientation of the upper plate 30 with respect to the lower plate 32 may vary from application to application depending upon the uses to which the panel fastener 10 is put. Accordingly, the present invention is not to be limited to a panel fastener having a head comprising upper and lower plates 30, 32 spaced apart in a parallel relationship.

The dog house 12 seen in FIG. 1 is a box-like structure having peripheral sidewalls that are secured at their top edges to the undersurface 16 of the primary panel 14. The bottom surface 38 of the dog house 12 is secured to the lower edges of the peripheral sidewalls of the dog house. The dog house 12 has an open end 40 which offers access to the interior of the dog house 12. It is to be noted that the interior of the dog house 12 is constructed and arranged to receive the upper plate 30 of the panel fastener 10 therein. Preferably the upper plate 30 of the panel fastener will be sized to form a relatively tight siding fit with the interior of the dog house 12. To that end, the upper plate 30 may be solid or more preferably, may be formed of a plurality of intersecting ribs 42 that create the requisite width, length, and depth necessary to form a relatively tight fit with the interior of the dog house 12.

The bottom surface 38 of the dog house 12 is provided with a slot 44 that is constructed and arranged to receive therein the post 34 of the panel fastener 10. Preferably the slot 44 will engage the post 34 in a snap-fit that retains the panel fastener within the dog house 12. It is to be understood that the size, shape and geometry of both of the post 34 and its cooperating slot 44 may be varied according to need in implementing the present invention so long as the panel fastener 10 can be securely received and retained in the dog house 12 attached to the primary panel 14. In order to assist in the alignment of the shank 22 of the panel fastener 10 with the bore 19 in the secondary panel 18, a base portion 46 of the slot 44 may be fashioned slightly larger than the other diameter of the shaft 34. This permits relative motion between the panel fastener 10 and the dog house 12 that can allow the panel fastener 10 to engage the secondary panel 18 where the primary and secondary panels are not perfectly aligned.

In order to more precisely locate the panel fastener 10 with respect to the primary panel 14, the upper plate 30 of the panel fastener is provided with a detent 50 that extends from an undersurface 52 of the upper plate 30 in the direction of the lower plate 32. Detent 50 is secured to a somewhat flexible area 54 of the upper plate 30 that may be deflected upwardly away from the lower plate 32 as the upper plate 30 is inserted into the interior of the dog house 12. The detent 50 is constructed and arranged to engage a bore 56 formed through the bottom surface 38 of the dog house. The detent 50 is self-centering with regard to the bore 56 and acts to position the panel fastener 10 within the interior of the dog house 12 in its desired position. The self-centering function of the detent 50 are accomplished by forming tapered surfaces 58 into the detent such that as the detent 50 engages the bore 56, the symmetrically tapped faces of the detent 50 will center the detent in the bore 56. Note that the detent 50 may be conical, frustoconical, a truncated pyramid (as illustrated), or any other useful shape capable of centering the detent within the bore 56.

In use, the panel fastener 10 is preassembled with the primary panel 14 by inserting the upper plate 30 of the head 20 into the open end 40 of the dog house 12. The edge of the upper plate 30 having the detent 50 formed adjacent thereto is inserted first into the open end 40 of the dog house 12 as indicated by dashed line 60. As the detent 50 encounters the bottom surface 38 of the dog house 12, the relatively flexible portion 54 of the upper plate 30 will be deflected upwardly towards the primary panel 14. Simultaneously, the post 34 will engage the slot 44. Continued pressure on the panel fastener 10 firmly seats the detent 50 within the bore 56 and the post 34 of the head 10 in the slot 44. Panel fastener 10 is now preassembled with the primary panel, and due to the self-centering action of the detent 50, is also located in a predetermined position calculated to be aligned with bore 19 formed in the secondary panel.

As can best be seen in FIG. 2, the lower plate 32 remains outside the dog house 12 when the panel fastener 10 is preassembled with the primary panel 14 such that the bottom surface 38 of the dog house 12 is interposed between the upper and lower plates 30, 32 of the head 20. Once the panel fastener 10 has been preassembled with the primary panel 14, the primary panel 14 is addressed to the secondary panel 18. In doing so, the tip 23 of the panel fastener is introduced into the bore 19 formed through the secondary panel 18. Pressure against the primary panel over the location of the dog house 12 and in a direction parallel to the length of shank 22 of the fastener 10 serves to drive the shank 22 into the bore 19. As the shank 22 of the panel fastener 10 is inserted into the bore 19, the arms 26 of the retaining mechanism 24 are deflected inwardly until the distal ends 28 of the arms 26 have passed through the bore 19. At this point, the arms 26 are resiliently biased back into their initial position such that the distal ends 28 of the arms 26 engage the under surface 21 of the secondary panel. Note the distance between the distal ends 28 of the arms 26 and the lower plate 32 of the head is roughly equivalent to the thickness of the secondary panel 18. Depending on the nature of fastening application, the distance between the distal ends 28 of the arms 26 and the lower plate 32 may be greater than, less than, or equal to the thickness of the secondary panel 18. It must be kept in mind that the distance between the retaining mechanism 24 and the lower plate 32 may also depend on the nature of the embodiment of the retaining mechanism that is employed. In the preferred embodiment of the invention illustrated in the Figures, it is desirable to have the distance between the retaining mechanism 24 and the plate 32 to be approximately the thickness of the secondary panel. Where an alternate embodiment of the retaining mechanism is utilized, such as a series of flexible ridges (not shown) formed around the shank 22 that engage the under surface of the secondary panel 18 through the bore 19, the distance between the retaining mechanism 24 and the lower plate 32 may be less than thickness of the secondary panel 18.

The invention described above may be embodied in other forms without departing from the spirit or essential characteristics thereof. The embodiments disclosed in this application are to be considered in all respects as illustrative and not restrictive. The scope of the invention is indicated by the appended claims rather than by the foregoing description; all changes which come within the meaning and range of equivalency of the claims are intended to be embraced therein.

What is claimed is:

1. An assembly for securing a primary panel to a secondary panel comprising:
    a doghouse; and
    a panel fastener comprising
        a head comprising an upper plate and a lower plate, the upper and lower plates being connected and maintained apart from one another in a generally parallel relationship by a post that is constructed and arranged to be received and retained in a slot formed in a bottom surface of the doghouse that extends from an undersurface of the primary panel, the upper plate including a flexible portion;
        a shank extending from the lower plate away from the upper plate, the shank having a retaining structure for retaining the shank of the panel fastener in a bore formed in the secondary panel where the shank of the panel fastener is inserted in the bore in the secondary panel; and,
        a detent that extends from an undersurface of the flexible portion of the upper plate in the direction of the lower plate of the head, such that the flexible portion of the upper plate is deflected upwardly away from the lower plate as the post is slidingly inserted into the slot of the doghouse in a first direction, and such that upon continued movement of the post in the first direction, the detent is constructed and arranged to engage the bottom surface of the doghouse when the post is received in the slot formed in the doghouse, the detent maintaining a predetermined alignment of the panel fastener with respect to the doghouse.

2. The panel fastener of claim 1 wherein the detent is self-centering with respect to a cooperating bore formed through the bottom surface of the dog house.

3. The panel fastener of claim 2 wherein the detent is self-centering with a bore having one of a circular or rectangular shape.

4. The panel fastener of claim 1 wherein the detent has a plurality of symmetrical outer faces that taper from a narrow tip to a broad base.

5. The panel fastener of claim 1 wherein the detent is formed in one of a pyramidal, conical, frustoconical, or hemispherical shape.

6. The panel fastener of claim 1 wherein the bottom surface of the dog house further has one of a depression and a bore formed therein that is constructed and arranged to engage the detent of the panel fastener when the panel fastener is received in the slot formed in the dog house.

7. The panel fastener of claim 1 wherein the bottom surface of the dog house further includes a bore positioned to engage the detent when the panel fastener is received in the slot formed in the dog house, the bore being formed symmetrically so as to cooperate with the detent in positioning the panel fastener with respect to the dog house.

8. A panel fastener for securing a primary panel to a secondary panel comprising:
    a head comprising an upper plate and a lower plate, the upper and lower plates being connected and maintained apart from one another in a generally parallel relationship by a post that is constructed and arranged to be received and retained in a slot formed in a bottom surface of a doghouse that extends from an undersurface of the primary panel;
    a shank extending from the lower plate away from the upper plate, the shank having a retaining structure for retaining the shank of the panel fastener in a bore formed in the secondary panel where the shank of the panel fastener is inserted in the bore in the secondary panel; and,
    a detent that extends from an undersurface of the upper plate in the direction of the lower plate of the head, the detent being constructed and arranged to engage the bottom surface of the doghouse when the post is received in the slot formed in the doghouse, the detent maintaining a predetermined alignment of the panel fastener with respect to the doghouse, wherein the detent has a plurality of symmetrical outer faces that taper from a narrow tip to a broad base.

9. The panel fastener of claim 8 wherein the detent is self-centering with respect to a cooperating bore formed through the bottom surface of the dog house.

10. The panel fastener of claim 9 wherein the detent is self-centering with a bore having one of a circular or rectangular shape.

11. The panel fastener of claim 8 wherein the bottom surface of the dog house further has one of a depression and a bore formed therein that is constructed and arranged to engage the detent of the panel fastener when the panel fastener is received in the slot formed in the dog house.

12. The panel fastener of claim 8 wherein the bottom surface of the dog house further includes a bore positioned to engage the detent when the panel fastener is received in the slot formed in the dog house, the bore being formed symmetrically so as to cooperate with the detent in positioning the panel fastener with respect to the dog house.

13. An assembly for securing a primary panel to a secondary panel, the assembly comprising:
    a doghouse having peripheral side walls secured at their top edges to an undersurface of the primary panel, a bottom surface secured to lower edges of the peripheral side walls, an open end which provides access to an interior of the doghouse, a slot in the bottom surface, and a depression in the bottom surface that is separate and spaced from the slot;
    a fastener having a head comprising an upper plate and a lower plate, the upper and lower plates being connected and maintained apart from one another in a generally parallel relationship by a post that is constructed and arranged to be received and retained in the slot formed in the bottom surface of the doghouse where the upper plate is adapted and configured to be received by the interior of the doghouse, a shank extending from the lower plate away from the upper plate, the shank having a retaining structure for retaining the shank of the fastener in a bore formed in the secondary panel where the shank of the panel fastener is inserted in the bore in the secondary panel, and a detent that extends from an undersurface of the upper plate in the direction of the lower plate of the head, the detent being constructed and arranged to engage the depression in the bottom surface of the doghouse when the post is received in the slot formed in the doghouse, the detent maintaining a predetermined alignment of the panel fastener with respect to the doghouse; and
    wherein the upper plate of the fastener includes at least one rib constructed and arranged such that the upper plate forms a relatively tight sliding fit with the interior of the doghouse.

14. The assembly of claim 13 wherein the upper plate of the fastener includes a flexible portion, such that the flexible portion of the upper plate is deflected upwardly away from the lower plate as the post is inserted into the slot of the doghouse.

15. The assembly of claim 13 wherein the slot of the doghouse and the post of the fastener are constructed and arranged such that the slot engages the post in a snap-fit manner.

16. The assembly of claim 13 wherein the depression in the doghouse is an opening extending through the bottom surface of the doghouse, the detent has a plurality of symmetrical outer faces that taper from a narrow tip to a broad base, and the detent is self-centering with respect to the opening in the bottom surface of the doghouse.

17. The assembly of claim 13 wherein a base portion of the slot is sized slightly larger than an outer diameter of the post of the fastener.

18. The assembly of claim 13 wherein the bottom surface of the doghouse is interposed between the upper and lower plates of the fastener.

19. The assembly of claim 13 wherein the detent is self-centering with respect to the depression in the bottom surface of the doghouse.

\* \* \* \* \*